United States Patent
Kim et al.

(10) Patent No.: US 8,456,595 B2
(45) Date of Patent: Jun. 4, 2013

(54) DISPLAY DEVICE AND METHOD FOR MANUFACTURING THE SAME

(75) Inventors: Gwan-Soo Kim, Cheonan-si (KR);
Jae-Hoon Kim, Cheonan-si (KR);
Seong-Gyu Kwon, Suwon-si (KR);
Tae-Gee Min, Seoul (KR); Sang-Hun Lee, Suwon-si (KR); Yi-Seop Shim, Suwon-si (KR); Sun-Young Chang, Bucheon-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/493,666

(22) Filed: Jun. 11, 2012

(65) Prior Publication Data

US 2012/0249937 A1 Oct. 4, 2012

Related U.S. Application Data

(62) Division of application No. 12/606,584, filed on Oct. 27, 2009, now Pat. No. 8,218,111.

(30) Foreign Application Priority Data

Nov. 13, 2008 (KR) .................. 10-2008-0112911
May 26, 2009 (KR) .................. 10-2009-0046029

(51) Int. Cl.
*G02F 1/1335* (2006.01)
*G02F 1/1339* (2006.01)

(52) U.S. Cl.
USPC .................................. 349/106; 349/156

(58) Field of Classification Search
USPC ........................................ 349/110, 106, 156
See application file for complete search history.

(56) References Cited

U.S. PATENT DOCUMENTS

| | | | |
|---|---|---|---|
| 5,495,354 A | 2/1996 | Jo | |
| 6,072,557 A * | 6/2000 | Kishimoto | 349/156 |
| 6,118,505 A * | 9/2000 | Nagata et al. | 349/106 |
| 7,292,294 B2 | 11/2007 | Hung et al. | |
| 7,746,443 B2 * | 6/2010 | Lan et al. | 349/187 |
| 8,089,592 B2 * | 1/2012 | Kwon et al. | 349/115 |
| 8,107,039 B2 | 1/2012 | Kim et al. | |

OTHER PUBLICATIONS

Notice of Allowance issued on Mar. 19, 2012 in U.S. Appl. No. 12/606,584.

* cited by examiner

*Primary Examiner* — James Dudek
(74) *Attorney, Agent, or Firm* — H. C. Park & Associates, PLC

(57) ABSTRACT

The present invention relates to a display device and a method for manufacturing the display device. The display device includes at least one partition formed on a lower display panel. A color filter may fill a region defined by the partitions. A first upper passivation layer is formed on the color filter, and a second upper passivation layer is formed on the first upper passivation layer and the partitions such that the LCD structure is planarized. In the display device, the height of the partition is sufficiently high to prevent mixing of the colors of neighboring pixel filters, and the process margin of the spacer and the light blocking member may be ensured. The partitions can be formed with multiple layers having different widths such that the mixture of colors between the neighboring pixels may be prevented, and the color reproducibility may be increased.

4 Claims, 19 Drawing Sheets

DISPLAY DEVICE AND METHOD FOR MANUFACTURING THE SAME

CROSS-REFERENCE TO RELATED APPLICATIONS

This application is a divisional of U.S. patent application Ser. No. 12/606,584, filed on Oct. 27, 2009, and claims priority from and the benefit of Korean Patent Application No. 10-2008-0112911, filed on Nov. 13, 2008, and Korean Patent Application No. 10-2009-0046029, filed on May 26, 2009, which are all hereby incorporated by reference for all purposes as if fully set forth herein.

BACKGROUND OF THE INVENTION

1. Field of the Invention

Exemplary embodiments of the present invention relate to a display device and a manufacturing method thereof.

2. Description of the Background

A liquid crystal display (LCD) is one of the most commonly used flat panel displays. An LCD may include two substrates with electrodes formed on the substrates, and a liquid crystal layer interposed between the two substrates. In the LCD, a voltage is applied to the electrodes to realign liquid crystal molecules of the liquid crystal layer to thereby regulate transmittance of light passing through the liquid crystal layer.

LCD structures with field generating electrodes formed on two display panels are widely used. A plurality of pixel electrodes and thin film transistors may be arranged in a matrix format on one of the display panels (hereinafter referred to as a thin film transistor array panel). Color filters of red, green, and blue, and a light blocking member are formed on the other display panel (hereinafter referred to as a common electrode panel). A common electrode may cover the entire surface of the common electrode panel.

However, in the above-described LCD structures, the pixel electrodes and the color filters are disposed on different display panels such that it is difficult to align the pixel electrodes and the color filters with each other. Accordingly, an alignment error may occur.

To solve this problem, a color filter on array (COA) structure in which the pixel electrodes and the color filters are formed on the same display panel is provided.

When forming the color filters along with the thin film transistor, the color filter may be formed by an Inkjet printing method. In the Inkjet printing method, liquid ink is sprayed (jetted) to predetermined divided portions to implement an ink-colored filter, and a plurality of colors including red, green, and blue can be simultaneously formed, such that the manufacturing process, time, and cost can be considerably reduced.

Liquid ink is used in the Inkjet printing. Thus partitions to enclose the ink may be required; however, the partitions may be formed improperly due to particles in a light exposer or poor adhesion with the substrate. If the partition is lost or has a small height, the liquid ink may pass through the lost part or over the partition such that colors of the neighboring pixels may be mixed.

Also, if the height of the partition is large, a step may be generated by a portion where the ink is not filled, and protrusions and depressions of a passivation layer may be formed due to the step such that a process margin for a light blocking member and a photosensitive film is reduced.

In addition, the thickness of the color filter may be different from the edge of the color filter to the central part thereof in one pixel. Accordingly, the color may be different between the central part of the color filter and the edge of the color filter, thereby decreasing the color reproducibility.

The above information disclosed in this BACKGROUND section is only for enhancement of understanding of the background of the invention and therefore may contain information that does not form the prior art that is already known in this country to a person of ordinary skill in the art.

SUMMARY OF THE INVENTION

Exemplary embodiments of the present invention relate to the prevention of color mixture of the color filter and to the increase in color reproducibility.

Additional features of the invention will be set forth in the description which follows, and in part will be apparent from the description, or may be learned by practice of the invention.

Exemplary embodiments of the present invention provide a method for manufacturing a display device. The method includes disposing a gate line and a data line on a first insulating substrate, forming, on the first insulating substrate, a thin film transistor connected to the gate line and data line, and disposing at least one partition. The method further includes disposing a color filter between a first partition and a second partition of the least one partition, disposing a first organic layer on the color filter to reduce a size of a step between the color filter and the at least one partition, and disposing a second organic layer on the first organic layer and the at least one partition.

Exemplary embodiments of the present invention provide a display device including a first insulation substrate, a gate line disposed on the first insulation substrate, a data line intersecting the gate line, a thin film transistor connected to the gate line and the data line, at least one partition disposed on the data line, a color filter, a first upper organic layer, and a second upper organic layer. The color filter is situated in a region defined by the at least one partition and has a height smaller than a height of the at least one partition. The first upper organic layer is disposed on the at least one partition. The second upper organic layer is disposed on the first upper passivation layer and the at least one partition.

Exemplary embodiments of the present invention provide a display device including a first insulation substrate, a gate line disposed on the first insulation substrate, a data line intersecting the gate line, a thin film transistor connected to the gate line and the data line, at least one partition disposed on the gate line and the data line, a second insulation substrate facing the first insulation substrate, and a spacer disposed on the at least one partition to maintain an interval between the first insulation substrate and the second insulation substrate.

Exemplary embodiments of the present invention provide a method for manufacturing a display device. The method includes disposing a gate line and a data line on a first insulating substrate, and forming a thin film transistor connected to the gate line and the data line. The method further includes disposing at least one partition comprising a lower partition on the gate line and the data line, and disposing a spacer on the at least one partition.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
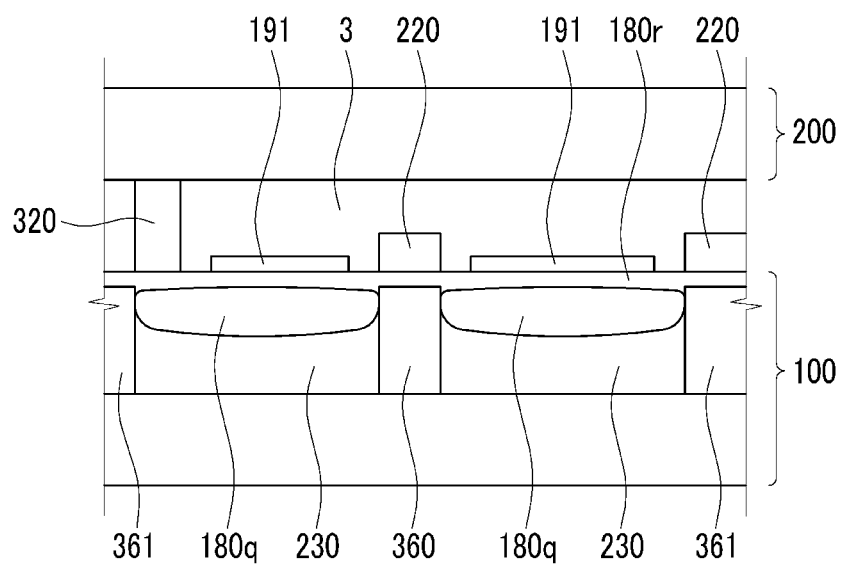
FIG. 1 is a schematic cross-sectional view of a liquid crystal display according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

It will be understood that, although the terms first, second, third etc. may be used herein to describe various elements, components, regions, layers and or sections, these elements, components, regions, layers and or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and or "comprising," when used in this specification, specify the presence of stated features, integers, steps, operations, elements, and or components, but do not preclude the presence or addition of one or more other features, integers, steps, operations, elements, components, and or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a cross-sectional view of a liquid crystal display according to exemplary embodiments of the present invention.

Referring to FIG. 1, a liquid crystal display may include a lower display panel 100, an upper display panel 200 facing the lower panel 100, and a liquid crystal layer 3 interposed between the two display panels 100 and 200.

The upper panel 200 may include a common electrode (not shown).

A partition 360 may be formed on the lower panel 100, which may include a thin film transistor (not shown). A color filter 230 may fill the region defined by partitions 360 and 361.

A first upper passivation layer 180q may be formed on the color filter 230, and a second upper passivation layer 180r may be formed on the whole surface of the substrate such that the LCD structure is planarized. For example, the second upper passivation layer 180r may be disposed over the first upper passivation layer 180q and the partition 360. The first upper passivation layer 180q and the second upper passivation layer 180r may be formed with the same organic material.

A pixel electrode 191 may be formed on the second upper passivation layer 180r. A light blocking member 220 and a spacer 320 may be formed on the pixel electrode 191.

In some cases, the second upper passivation layer 180r may planarize the substrate and reduce the step between the color filter 230 and the partition 360 through the first upper passivation layer 180q. The second upper passivation layer 180r may provide one more planarized surface in addition to the first upper passivation layer 180q.

In some cases, when forming a passivation layer as a single layer, a step may exist between the color filter 230 and the partition 360, such that the passivation layer may not be planarized. The step size may increase as the height of the partition 360 is increased such that the thickness of the passivation layer to remove the step becomes thicker.

A cell gap between the two display panels 100 and 200 may have a uniform interval, but if the thickness of the passivation layer becomes thick, the cell gap may decrease such that the process margin for forming the spacer 320 and the light blocking member 220 is reduced.

Light leakage may be prevented by using light blocking members 220 having a predetermined size (e.g., thickness, height). If the cell gap is decreased, the size of the light blocking member 220 may be reduced and light leakage may thereby not be completely prevented. In general, the light blocking member 220 may have any suitable thickness. In some cases, the light blocking member 220 may be formed with a thickness of greater than 1 μm.

The first upper passivation layer 180q may reduce the step between the color filter 230 and the partition 360. The second upper passivation layer 180r may be formed such that the second upper passivation layer 180r may be thinly formed but may ensure a sufficient cell gap.

Figure 2:
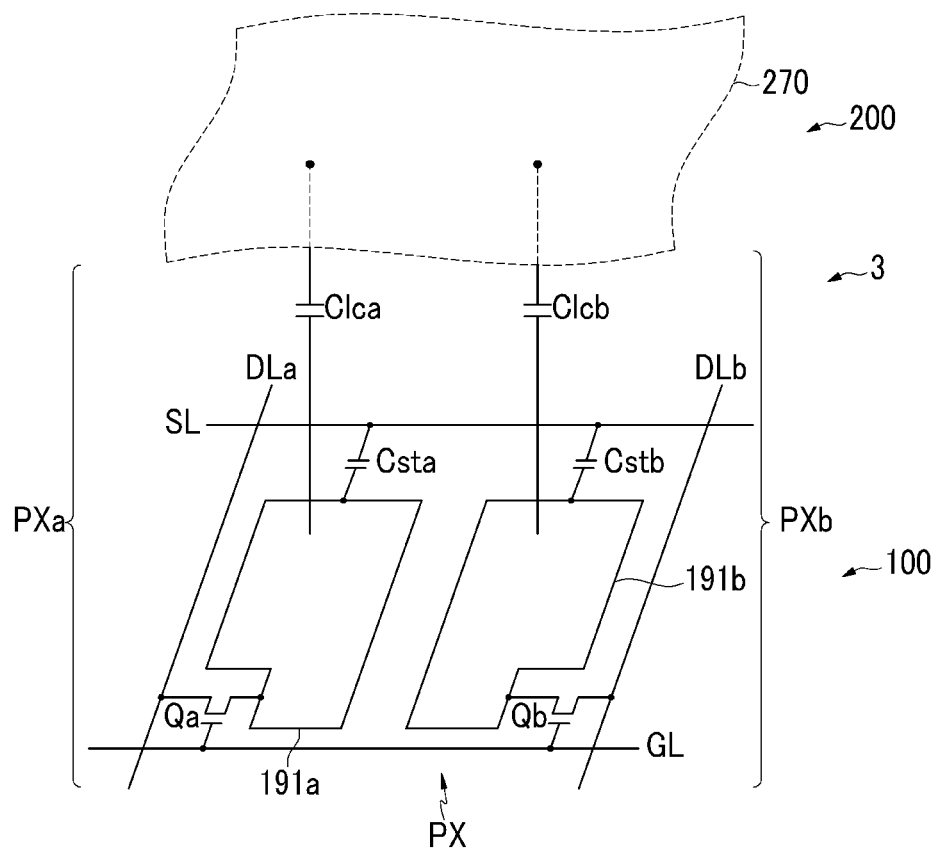
FIG. 2 is an equivalent circuit diagram of a pixel in a liquid crystal display according to exemplary embodiments of the present invention.

FIG. 2 is an equivalent circuit diagram of a pixel in a liquid crystal display (LCD) according to exemplary embodiments of the present invention.

Referring to FIG. 2, a LCD may include signal lines (e.g., a plurality of gate lines GL, a plurality of pairs of data lines DLa and DLb, and a plurality of storage electrode lines SL) and a plurality of pixels PX connected to the signal lines. The LCD may include the lower panel 100 and the upper panel 200 facing each other, and a liquid crystal layer 3 interposed between the two panels.

Each pixel PX may have a pair of subpixels PXa and PXb. Each subpixel PXa and PXb may be connected to a switching element Qa and Qb, a liquid crystal capacitors Clca and Clcb, and a storage capacitors Csta and Cstb.

Each switching element Qa and Qb may be a three-terminal element, such as a thin film transistor, provided on the lower panel 100. The switching element Qa and Qb may have a control terminal connected to the gate line GL, an input terminal connected to the data line DLa and DLb, and an output terminal connected to the liquid crystal capacitors Clca and Clcb and the storage capacitors Csta and Cstb.

The liquid crystal capacitors Clca and Clcb may be connected to subpixel electrodes 191a and 191b and a common electrode 270. The liquid crystal layer 3 between the two panels 100 and 200 (and terminals of the capacitors Clca and Clcb) may function as a dielectric material.

The storage capacitors Csta and Cstb may be coupled to the liquid crystal capacitors Clca and Clcb and the storage electrode line SL provided on the lower display panel 100. The subpixel electrodes 191a and 191b may overlap with an insulator interposed therebetween, and a predetermined voltage such as the common voltage Vcom may be applied to the subpixel electrodes 191a and 191b.

Two predetermined voltages being different from one another may be applied to the two liquid crystal capacitors Clca and Clcb. For example, a data voltage applied to the liquid crystal capacitor Clca may be less or more than the data voltage applied to the liquid crystal capacitor Clcb. Therefore, when the voltages of the first and second liquid crystal capacitors Clca and Clcb are appropriately adjusted, an image viewed from one side of the LCD may appear similar to an image viewed from the front of the LCD. Accordingly, side visibility (e.g., viewing angle) of the LCD may be improved.

Next, a liquid crystal display according to exemplary embodiments of the present invention will be described in detail with reference to FIG. 3, FIG. 4, FIG. 5, FIG. 6, and FIG. 7.

Figure 3:
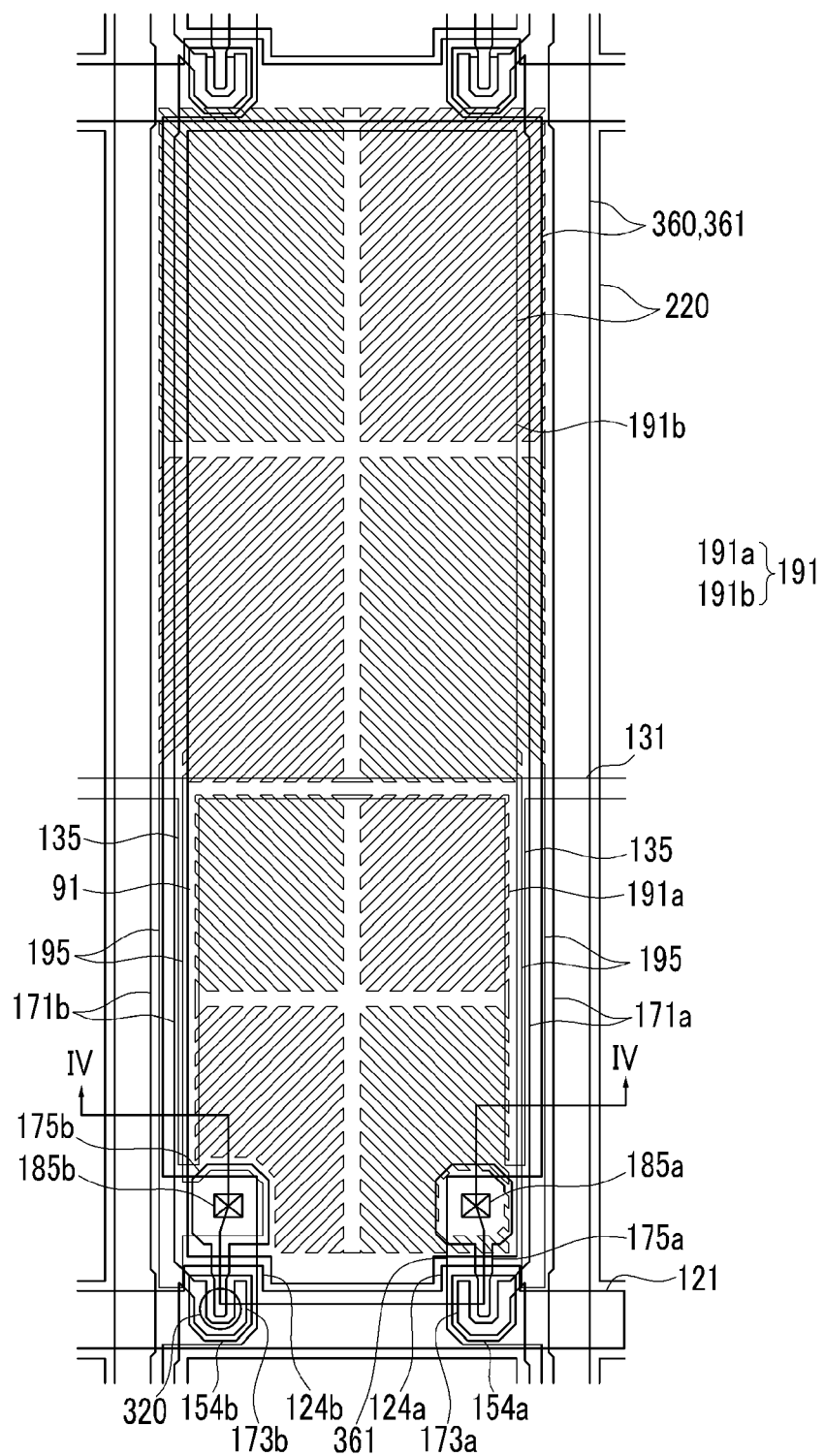
FIG. 3 is a layout view of a liquid crystal display according to exemplary embodiments of the present invention.
Figure 4:
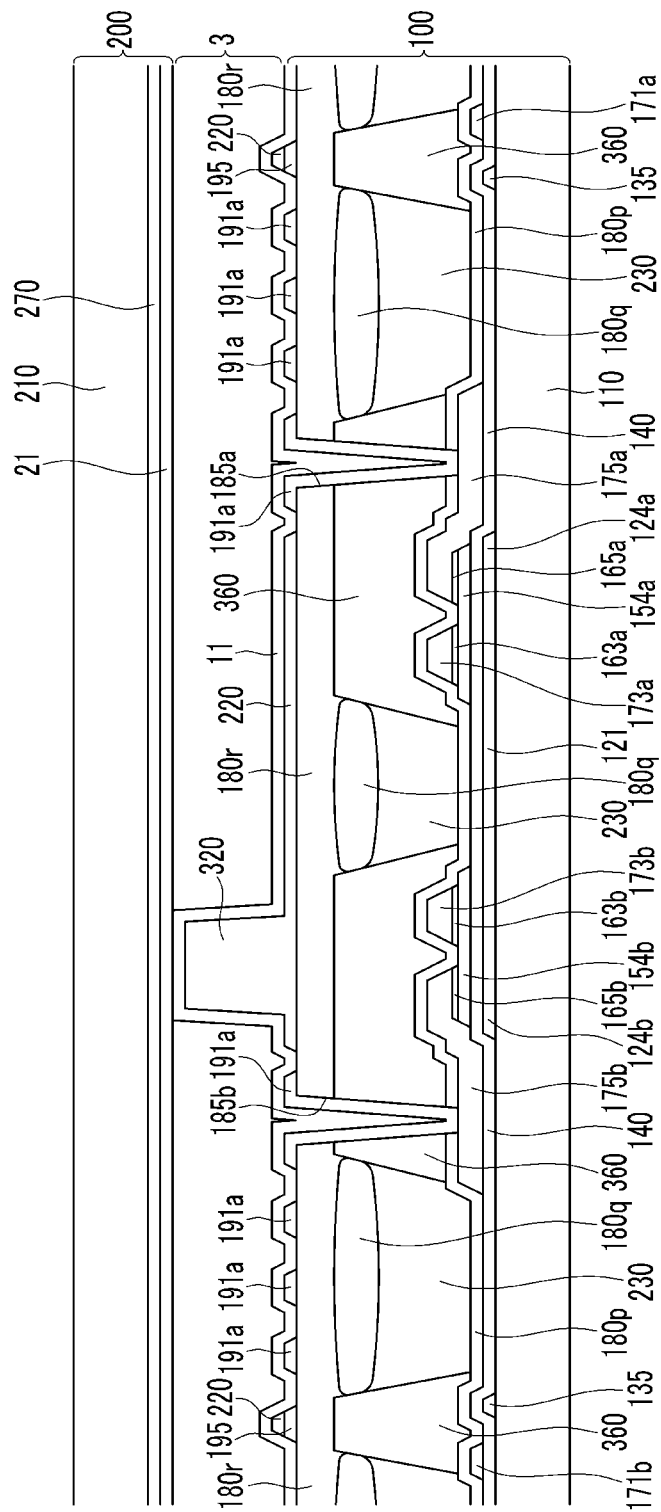
FIG. 4 is a cross-sectional view taken along the IV-VI line of the liquid crystal display of FIG. 3, according to exemplary embodiments of the present invention.
Figure 5:
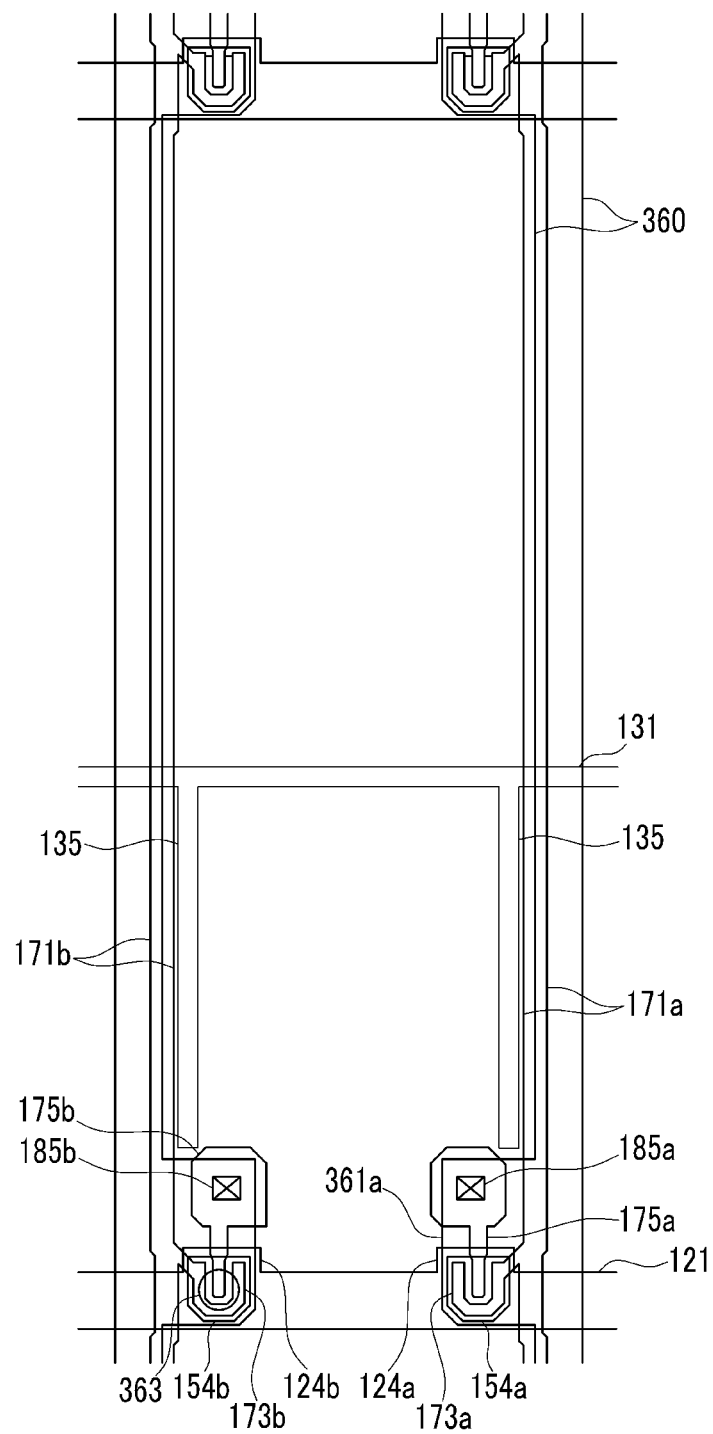
FIG. 5 is a layout view of a thin film transistor array panel excluding a pixel electrode in the liquid crystal display of FIG. 3, according to exemplary embodiments of the present invention.
Figure 6:
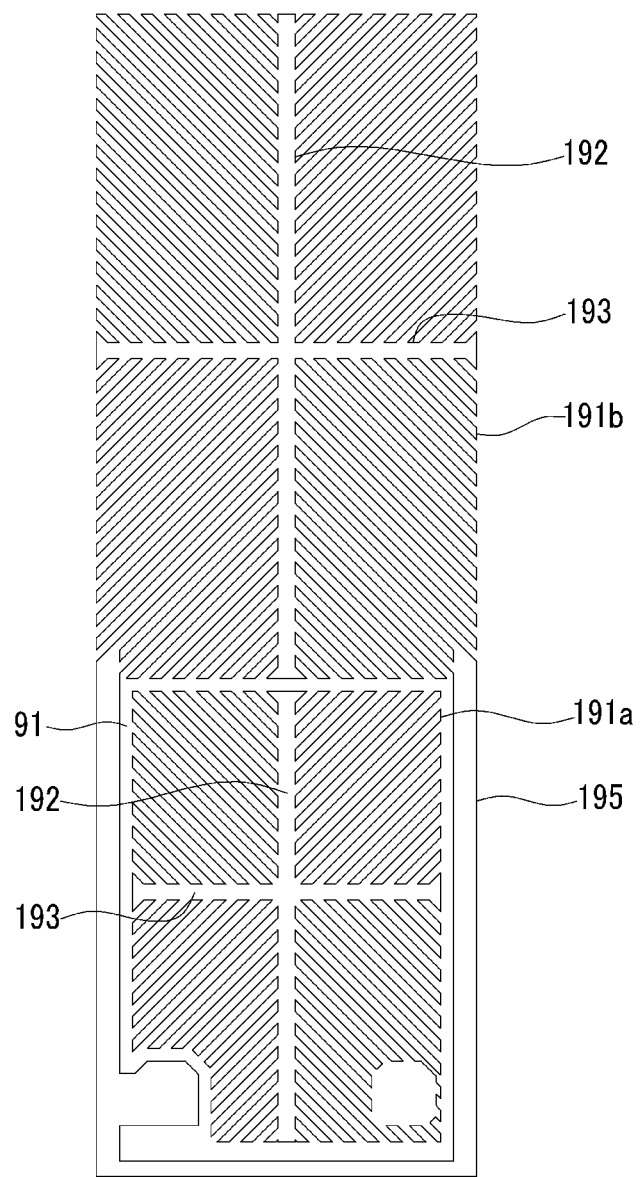
FIG. 6 is a layout view of a pixel electrode of the liquid crystal display of FIG. 3 according to exemplary embodiments of the present invention.
Figure 7:
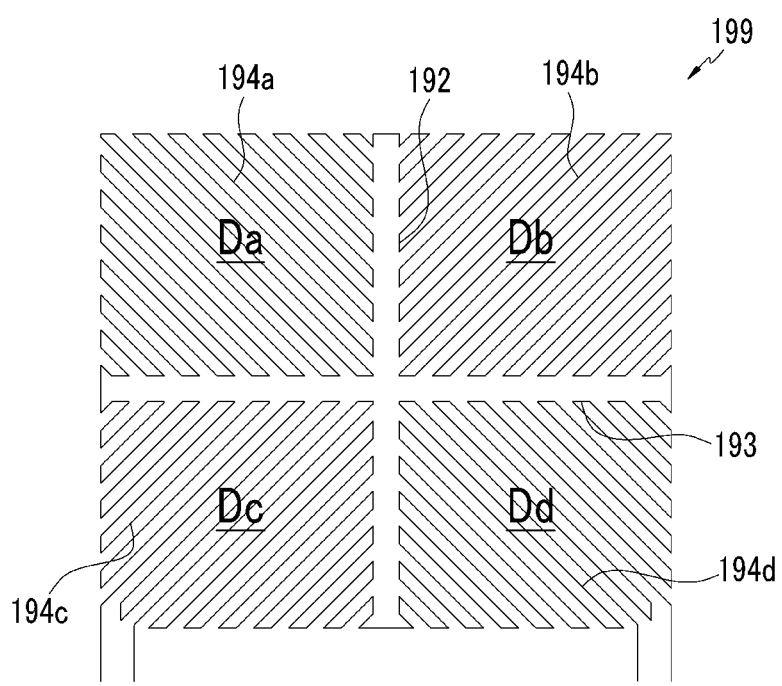
FIG. 7 is a top plan view of a base electrode of a pixel electrode according to exemplary embodiments of the present invention.

FIG. 3 is a layout view of a liquid crystal display according to exemplary embodiments of the present invention. FIG. 4 is a cross-sectional view taken along the IV-IV line of the liquid crystal display of FIG. 3. FIG. 5 is a layout view of a thin film transistor array panel excluding a pixel electrode in the liquid crystal display of FIG. 3. FIG. 6 is a layout view of a pixel electrode of the liquid crystal display of FIG. 3. FIG. 7 is a top plan view of a base electrode of a pixel electrode according to exemplary embodiments of the present invention.

A LCD may include a lower display panel 100, an upper display panel 200 facing the lower display panel 100, and the liquid crystal layer 3 interposed between the lower and upper display panels 100 and 200.

Firstly, the lower display panel 100 of the LCD will be described.

A plurality of gate lines 121 and a plurality of storage electrode lines 131 and 135 may be formed on an insulating substrate 110.

The gate lines 121 may transmit gate signals and may be substantially extended in the transverse direction. Each gate line 121 may include a plurality of first and second gate electrodes 124a and 124b protruding upward.

The storage electrode lines 135 may include a stem 131 extending substantially parallel to the gate lines 121 and a plurality of storage electrodes 135 extended from the stem 131. It should be understood that the plurality of storage electrode lines 131 and 135 may be implemented in various shapes and arrangements.

A gate insulating layer 140 may be formed on the gate lines 121 and the storage electrode lines 131 and 135. A plurality of semiconductors 154a and 154b may be formed on the gate insulating layer 140. The semiconductors 154a and 154b may be made of any suitable material, and, in some cases, may be made of amorphous or crystallized silicon.

A plurality of pairs of ohmic contacts 163b and 165b may be formed on the first semiconductor 154b. In general, the ohmic contacts 163b and 165b may be formed of any suitable material. In some cases, the ohmic contacts 163b and 165b may be formed of a material such as n+ hydrogenated amorphous silicon in which an n– type impurity is doped with a high concentration, or of silicide. Ohmic contact pairs 163a and 165a may be formed on the second semiconductor 154a.

A plurality of pairs of data lines 171a and 171b and a plurality of pairs of first and second drain electrodes 175a and 175b may be formed on the gate insulating layer 140 and on the ohmic contacts 165a and 165b, respectively.

The data lines 171a and 171b may transmit data signals, may extend substantially in the longitudinal direction, and may cross the gate lines 121 and the stems 131 of the storage electrode lines. The data lines 171a and 171b may be connected to a plurality of first and second source electrodes 173a and 173b extending toward the first and second gate electrodes 124a and 124b. The first and second source electrodes 173a and 173b may be formed on the ohmic contacts 163a and 163b, may be curved in a "U" shape, and may be situated opposite to the first and second drain electrodes 175a and 175b, with respect to the first and second gate electrodes 124a and 124b.

Each first drain electrode 175a may be enclosed by the first source electrode 173a at one end of the first drain electrode 175a, which may be extended upward (e.g., towards the upper panel 200). The other end of the first drain electrode 175a may have a wide area for connection to another layer.

It should be understood that various suitable shapes and arrangements of the first and second drain electrodes 175a and 175b and the data lines 171a and 171b may be used.

The first and second gate electrodes 124a and 124b, the first and second source electrodes 173a and 173b, the first and second drain electrodes 175a and 175b, and the first and second semiconductors 154a and 154b, respectively, may form the first and second thin film transistors (TFT) Qa and Qb along with the channels of the first and second thin film transistors Qa and Qb formed on the first and second semiconductors 154a and 154b between the first and second source electrodes 173a and 173b and the first and second drain electrodes 175a and 175b, respectively.

The ohmic contacts 163a, 163b, 165a, and 165b may be interposed between the underlying semiconductor islands 154a and 154b and the overlying source electrodes 173a and 173b and drain electrodes 175a and 175b. The ohmic contacts 163a, 163b, 165a, and 165b may reduce contact resistance between the underlying and overlying layers. The semiconductors 154a and 154b have a portion that is exposed and is not covered by the data lines 171a and 171b and the drain electrodes 175a and 175b. The semiconductors 154a and 154b may also have an exposed portion between the source electrodes 173a and 173b and the drain electrodes 175a and 175b.

A lower passivation layer 180p may be formed on the data lines 171a and 171b, the drain electrodes 175a and 175b, and the exposed portions of the semiconductors 154a and 154b.

The lower passivation layer 180p may be made of any suitable material, and, in some cases, of silicon nitride or silicon oxide.

A partition 360 may be formed on the lower passivation layer 180p. The partition 360 may be formed along the gate lines 121 and the data lines 171a and 171b, and may also be disposed on the thin film transistor. A region enclosed by two partitions 360 may substantially form a filling region where the color filter 230 and the first upper passivation layer 180q may be situated.

The filling region may be filled by a color filter 230, which may have a dimension (e.g., height, thickness) less than the height of the partition 360.

The first upper passivation layer 180q may be formed on the color filter 230. The first upper passivation layer 180q may reduce a step introduced due to a height difference between the partition 360 and the color filter 230.

The second upper passivation layer 180r may be formed on the first upper passivation layer 180q and the partition 360. The second upper passivation layer 180r may be disposed on the substrate. In some cases, the second upper passivation layer 180r may be disposed on the entire substrate, thereby planarizing the LCD structure. The first upper passivation layer 180q and the second upper passivation layer 180r may be formed using any suitable organic material. In some cases, the first upper passivation layer 180q and the second upper passivation layer 180r may be formed using the same organic material.

To facilitate explanation of exemplary embodiments of the present invention, the first upper passivation layer 180q and the second upper passivation layer 180r are shown as divided (i.e., two separate layers); however, when the first upper passivation layer 180q and the second upper passivation layer 180r are manufactured with the same material, the first upper passivation layer 180q and the second upper passivation layer 180r may not be divided and/or distinguishable.

A plurality of contact holes 185a and 185b exposing the first and second drain electrodes 175a and 175b may be formed in the second upper passivation layer 180r, the partition 360, and the lower passivation layer 180p.

A plurality of pixel electrodes 191 may be formed on the second upper passivation layer 180r.

Each pixel electrode 191 may include the first and second subpixel electrodes 191a and 191b that are separated by a gap 91 having a quadrangular belt shape. The first and second subpixel electrodes 191a and 191b may include a basic electrode 199, as shown in FIG. 7, or a modification thereof.

The basic electrode 199 will be described in detail with reference to FIG. 7.

As shown in FIG. 7, the basic electrode 199 may be quadrangular and may include a cross-shaped stem having a transverse stem 193 crossing a longitudinal stem 192. The basic electrode 199 may be divided into a first sub-region Da, a second sub-region Db, a third sub-region Dc, and a fourth sub-region Dd by the transverse stem 193 and the longitudinal stem 192. Each of the sub-regions Da, Db, Dc, and Dd may include a plurality of first to fourth minute branches 194a, 194b, 194c, and 194d.

The first minute branch 194a may obliquely extend from the transverse stem 193 or the longitudinal stem 192 towards the upper-left direction; the second minute branch 194b may obliquely extend from the transverse stem 193 or the longitudinal stem 192 towards the upper-right direction; the third minute branch 194c may obliquely extend from the transverse stem 193 or the longitudinal stem 192 towards the lower-left direction; and the fourth minute branch 194d may obliquely extend from the transverse stem 193 or the longitudinal stem 192 towards the lower-right direction.

The first to fourth minute branches 194a, 194b, 194c, and 194d may form an angle of about 45 degrees or 135 degrees with respect to the gate lines 121 or the transverse stem 193. The minute branches 194a, 194b, 194c, and 194d of two neighboring sub-regions Da-Dd (e.g., Da and Dc, Dc and Dd) may be crossed.

Although not shown, the width of the minute branches 194a, 194b, 194c, and 194d may become wider close to the transverse stem 193 or the longitudinal stem 192.

Referring back to FIG. 3, FIG. 4, FIG. 5, and FIG. 6, the first and second subpixel electrodes 191a and 191b may include at least one basic electrode 199. The area occupied by the second subpixel electrode 191b may be larger than the area occupied by the first subpixel electrode 191a in the whole pixel electrode 191. For example, the area of the second subpixel electrode 191b may be 1.0 to 2.2 times the area of the first subpixel electrode 191a. The basic electrode 199 in the first subpixel electrode 191a may be formed differently from the basic electrode 199 in the second subpixel electrode 191b.

The second subpixel electrode 191b may include a pair of branches 195 extending along the data lines 171. The branches 195 may be disposed between the first subpixel electrode 191b and the data line 171, and may be connected to the lower portion of the first subpixel electrode 191b. One of the two branches 195 may be extended and may be physically and electrically connected to the second drain electrode 175b through the contact hole 185b. The first subpixel electrode 191a may be connected to the first drain electrode 175a through the contact hole 185a.

The first and second subpixel electrodes 191a and 191b may receive the data voltage from the first and second drain electrodes 175a and 175b.

A spacer 320 and light blocking member 220 may be formed on the pixel electrode 191. The light blocking member 220 may be formed along the gate lines 121 and data lines 171, and the spacer 320 may be situated at a position corresponding to the thin film transistor.

The spacer 320 and the light blocking member 220 may each be formed by using a photomask (not shown), or they may be simultaneously formed using one photomask. The spacer 320 and the light blocking member 220 may be formed of an organic material colored with a black color dye.

An alignment layer 11 may be formed on the spacer 320 and the light blocking member 220.

Next, the upper display panel 200 will be described.

Referring to the upper display panel 200, the common electrode 270 may be disposed over the entire surface of a transparent insulation substrate 210, and an alignment layer 21 may be formed on the common electrode 270.

A manufacturing method of a thin film transistor array panel for the LCD shown in FIG. 3 and FIG. 4 will be now described with reference to FIG. 8, FIG. 9, FIG. 10, FIG. 11, and FIG. 12.

FIG. 8, FIG. 9, FIG. 10, FIG. 11, and FIG. 12 are cross-sectional views sequentially showing a manufacturing method of the thin film transistor array panel for the LCD shown in FIG. 3 and FIG. 4.

Figure 8:
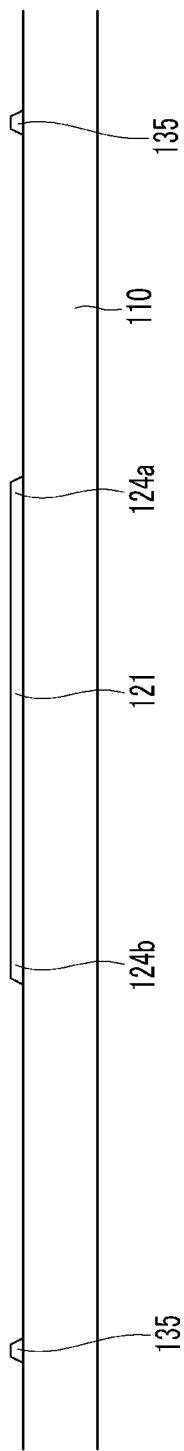
FIG. 8, FIG. 9, FIG. 10, FIG. 11, and FIG. 12 are cross-sectional views sequentially showing a manufacturing method of a thin film transistor array panel for the liquid crystal display of FIG. 3 and FIG. 4, according to exemplary embodiments of the present invention.

As shown in FIG. 8, a gate line 121 including gate electrodes 124a and 124b and a storage electrode line including a storage electrode 135 may be formed on an insulation substrate 110.

Figure 9:
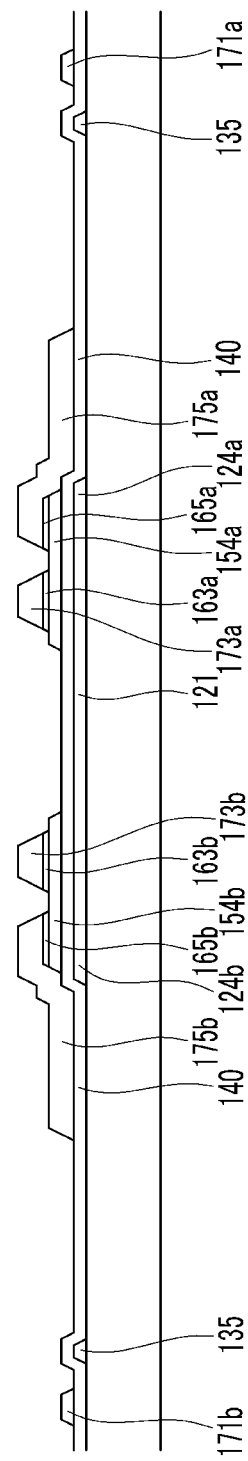

Next, as shown in FIG. 9, silicon oxide may be deposited on the substrate 110 and the gate line 121 to form a gate insulating layer 140.

Next, an amorphous silicon layer that is not doped with an impurity, an amorphous silicon layer that is doped with an impurity, and a data conductive layer may be sequentially deposited and patterned to form an ohmic contact layer pattern and semiconductors 154a and 154b.

Next, a conductive material may be formed on the ohmic contact layer pattern, and may be patterned to form data lines 171a and 171b including source electrodes 173a and 173b, and drain electrodes 175a and 175b.

Next, the exposed amorphous silicon layer may be etched by using the source electrodes 173a and 173b and the drain electrode 175a and 175b as an etch mask to form ohmic contact layers 163a, 163b, 165a, and 165b.

The semiconductors 154a and 154b, the ohmic contact layers 163a, 163b, 165a, and 165b, the data lines 171a and 171b, and the drain electrodes 175a and 175b may each be formed by using a mask, or may be formed together by using a photoresist pattern having different thicknesses through a slit mask. In some cases, the ohmic contact layer pattern may have the same plane shape as the data lines and the drain electrodes.

Figure 10:
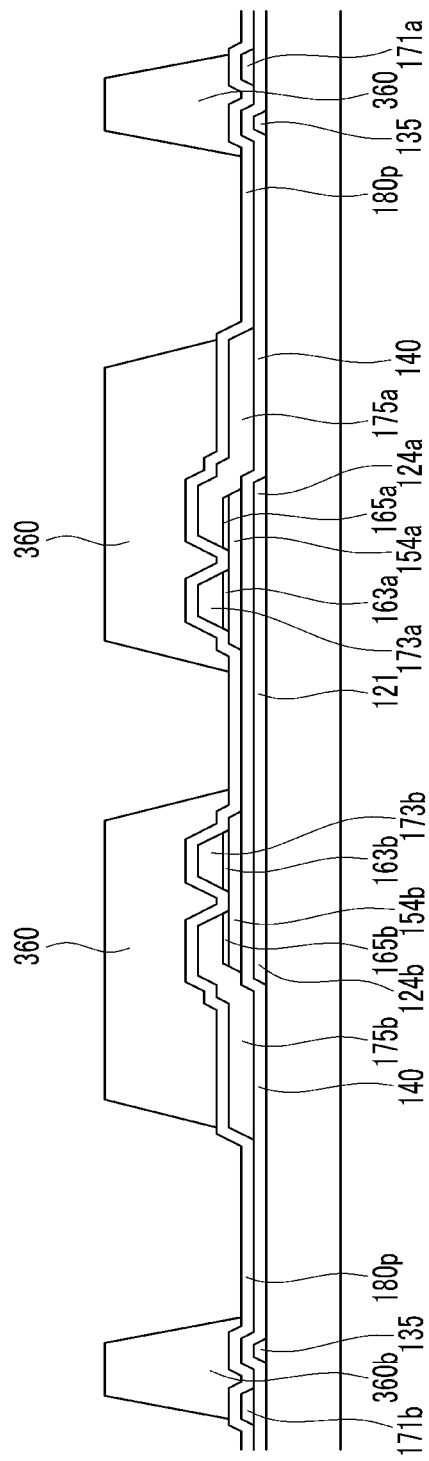

As shown in FIG. 10, a lower passivation layer 180p may be formed on the data lines 171a and 171b, the source electrodes 173a and 173b, and the drain electrodes 175a and 175b. Next, an organic insulator may be deposited on the lower passivation layer 180p and patterned to form a partition 360. The partition 360 may be formed in various shapes and sizes. In some cases, the partition 360 may have a thickness of 4.0-5.0 µm such that a color filter that is formed later may not be mixed.

Figure 11:
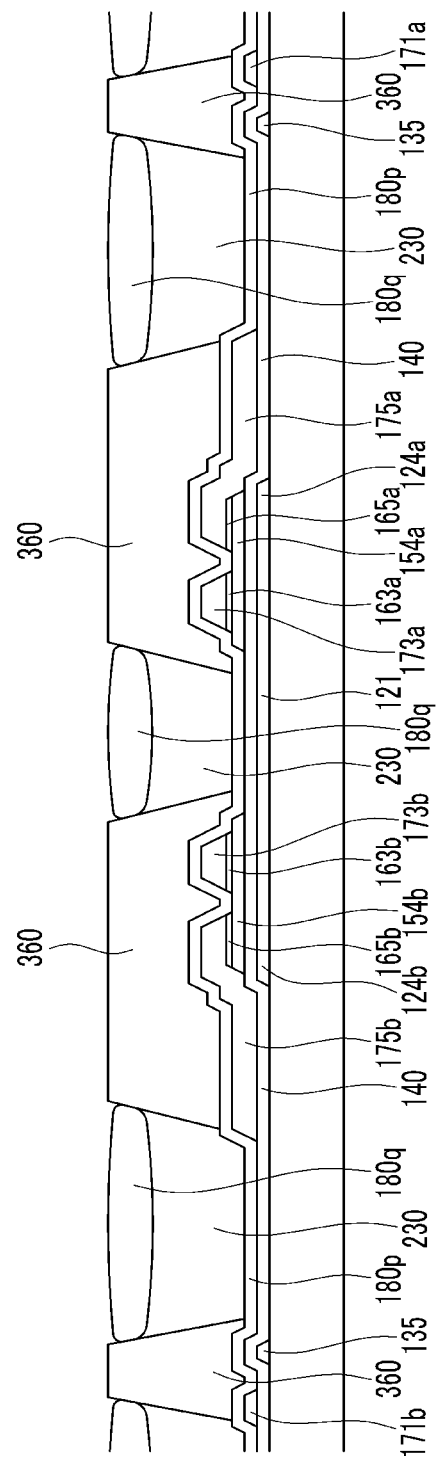

Next, as shown in FIG. 11, a color filter 230 may be formed in a pixel defined by partitions 360. The color filter 230 may be formed by Inkjet printing, wherein an Inkjet head drips a color filter solvent while being moved. Subsequently, the color filter solvent may be dried.

Next, the first upper passivation layer 180q may be formed between the partitions 360, thereby decreasing the step size between the partition 360 and the color filter 230. The upper passivation layer 180q may be formed through Inkjet printing.

If the height of the color filter 230 is relatively high, the step size between the partition 360 and the color filter 230 may be reduced. However, by reducing the step size, the amount of the ink used to form the first upper passivation layer 180q may be difficult to control. Accordingly, the color filter 230 may be formed 1 µm-2 µm lower than the partition 360.

Figure 12:
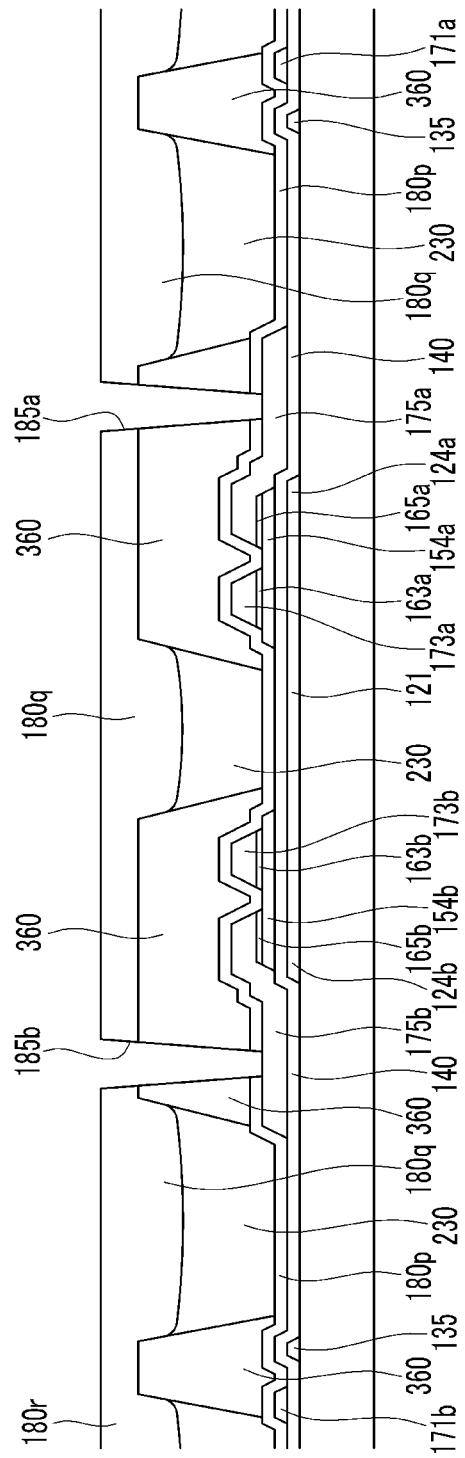

As shown in FIG. 12, the second upper passivation layer 180r may be formed on the color filter 230 and the first upper passivation layer 180q. The second upper passivation layer 180r may be formed through slit coating, and the organic material may be disposed while the ink disposing nozzle is passed through the substrate in the slit coating.

The height difference between the partition 360 and the color filter 230 may be decreased by the first upper passivation layer 180q and the LCD structure may be easily planarized even if the second upper passivation layer 180r is not thickly formed. Although the first upper passivation layer 180q may be formed higher than the partition 360 because the second upper passivation layer 180r may cover the partition 360 and the first upper passivation layer 180q, the step may be removed. Also, when forming the first upper passivation layer 180q, although the first upper passivation layer 180q may be disposed over the partition 360, the step may still be removed.

Next, the second upper passivation layer 180r, the first upper passivation layer 180q, the partition 360, and the lower passivation layer 180p may be patterned to form contact holes 185a and 185b. If the second upper passivation layer 180r and the first upper passivation layer 180q are formed of photosensitive organic material, the first and second upper passivation layers 180r and 180q may be patterned using a photolithography process. An etching process for patterning the partition 360 and the lower passivation layer 180p may be added.

Next, as shown in FIG. 4, a pixel electrode 191 may be formed on the second upper passivation layer 180r. A photosensitive organic material layer may be formed on the pixel electrode 191, and may be exposed and developed using a photomask including the slit pattern to form a light blocking member 220 and a spacer 320. The light blocking member 220 and spacer 320 may have different thicknesses.

Figure 13:
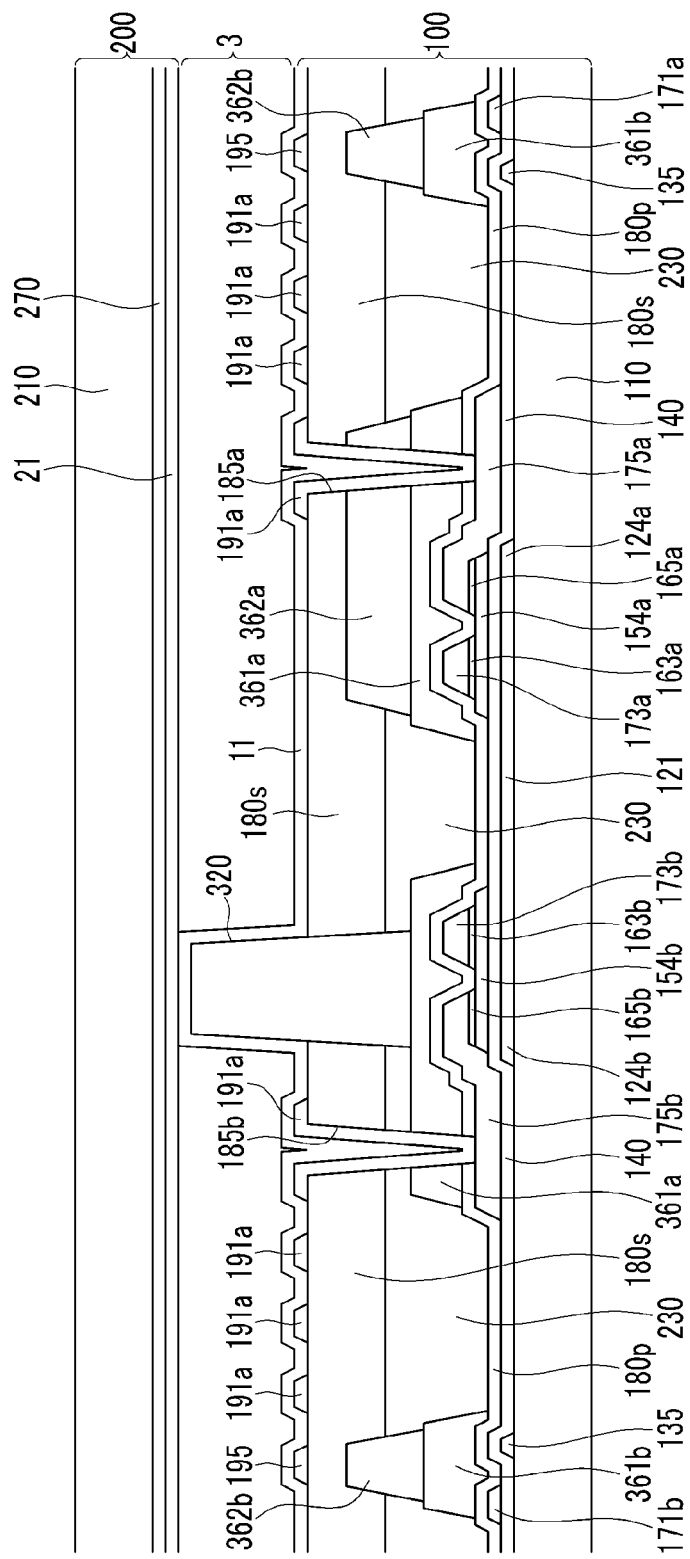
FIG. 13 is a cross-sectional view of a liquid crystal display according to exemplary embodiments of the present invention.

FIG. 13 is a cross-sectional view of a liquid crystal display according to exemplary embodiments of the present invention.

The liquid crystal display according to the illustrated exemplary embodiment of FIG. 13 has a similar structure as the illustrated exemplary embodiments of FIG. 3 and FIG. 4, however the shapes of the partitions 360 and the spacer 320 are different. For example, as shown in FIG. 13, partitions may include lower partitions 361a and 361b and upper partitions 362a and 362b. The spacer 320 may be integrally formed with upper partitions 362a and 362b. A gate line 121 including gate electrodes 124a and 124b and a storage electrode line 135 may be formed on a substrate 110. A gate insulating layer 140, semiconductors 154a and 154b, ohmic contacts 163a, 163b, 165a, and 165b, data lines 171a and 171b including source electrodes 173a and 173b, and drain electrodes 175a and 175b may be formed on the gate line 121 and the storage electrode line, as previously described with reference to FIG. 8 to FIG. 12. A lower passivation layer 180p may then be formed on the drain electrodes 175a and 175b, the source electrodes 173a and 173b, and the data lines 171a and 171b.

Furthermore, as previously described with reference to FIG. 8 to FIG. 12, a partition 360 may be formed on the lower passivation layer 180p. The partition 360 may be formed along the gate line 121 and the data lines 171a and 171b, and may be formed relative to (e.g., above) the thin film transistor. The region enclosed by the partitions 360 may form an approximate quadrangular (e.g., rectangular) shape, and may serve as a filling region where a color filter 230 and an upper passivation layer 180q may be filled.

The partition 360 may include the lower partition 361 and the upper partition 362 formed on the lower partition 361. The lower partition 361 and the upper partition 362 may have the same plane pattern, and the upper partition 362 may have a smaller width than the lower partition 361.

The lower and upper partitions 361 and 362 may include the first portions 361a and 362a situated at a position corresponding to the location of a thin film transistor. The second portions 361b and 362b may be formed on the gate lines 121 and the data lines 171a and 171b. A spacer 320 having a height greater than upper partitions 362a and 362b may be formed on the lower partition portions 361a in place of the first portion 362a of the upper partition 362.

The lower and upper partitions 361 and 362 may be formed with black color organic material such that the lower and upper partitions 361 and 362 may be used as light blocking members for preventing light leakage. The spacer 320 may also be formed of the black color organic material.

Figure 14:
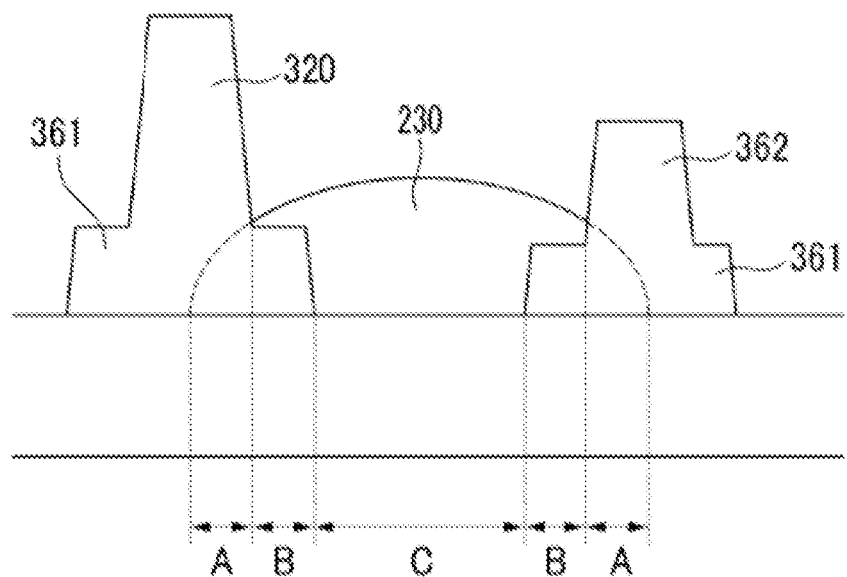
FIG. 14 is a cross-sectional view of a color filter and a partition in one pixel according to exemplary embodiments of the present invention.

Referring to FIG. 14, a color filter 230 may be situated between two partitions 360. One of the partitions 360 may include a lower and upper partition 361 and 362, and the other partition 360 may include a lower partition 361 and a spacer 320. The spacer 320 may be formed on a lower partition portion 361a. An edge of the color filter 230 may be positioned on the lower partition 361. When the edge of the color filter 230 is positioned on the lower partition 361, the portion B may have a different height than the central part C of the color filter 230, and portion B may have a smaller height compared to conventional art. Also, the edge portion B may be covered by the lower partition 361 such that a different color from the central part C is not provided. Accordingly, the decrease of color reproducibility due to the height difference between the central part C and the edges A and B of the color filter 230 may be reduced.

Upper passivation layers 180q and 180r may be formed on the color filter 230. The upper passivation layers 180q and 180r may be formed with the same height as the first and second portions 362a and 362b of the upper partition 362, or may be formed to cover them, but may not be formed to cover the spacer 320. The upper passivation layers 180q and 180r may protect the color filter 230, and simultaneously planarize the LCD structure.

The upper passivation layers 180q and 180r may be made of photosensitive organic material. The upper passivation layers 180q and 180r may have a height of more than 1.0 μm to reduce coupling between the pixel electrode 191 and the data lines 171a and 171b.

A plurality of contact holes 185a and 185b may be situated in the upper passivation layer 180q and the lower passivation layer 180p to expose the first and second drain electrodes 175a and 175b.

A plurality of pixel electrodes 191 may be formed on the upper passivation layers 180q and 180r. The spacer 320 of the upper partition 362 may be protruding upward (e.g., toward the pixel electrode 191).

An upper panel 200 including a common electrode 270 and an alignment layer 21 formed on the common electrode 270 may then be formed across the entire surface of a transparent insulation substrate 210.

Although not shown, a light blocking member may be formed on the substrate 210 between partitions 361 and 362. A separate light blocking member may be formed on the lower substrate 110.

The spacer 320 may be used to maintain an interval between the upper display panel 200 and the lower display panel 100.

Next, a manufacturing method of a thin film transistor array panel for the liquid crystal display of FIG. 13 will be described with reference to FIG. 15, FIG. 16, FIG. 17 and FIG. 18 as well as the above-described FIG. 8 and FIG. 9.

FIG. 15, FIG. 16, FIG. 17, and FIG. 18 are cross-sectional views sequentially showing a manufacturing method of a thin film transistor array panel for the liquid crystal display of FIG. 13.

Referring to FIG. 8 and FIG. 9, a gate line 121 including gate electrodes 124a and 124b, a gate insulating layer 140, ohmic contact layers 163a, 163b, 165a, and 165b, semiconductors 154a and 154b, data lines 171a and 171b including source electrodes 173a and 173b, and drain electrodes 175a and 175b may be formed on an insulation substrate 110.

Figure 15:
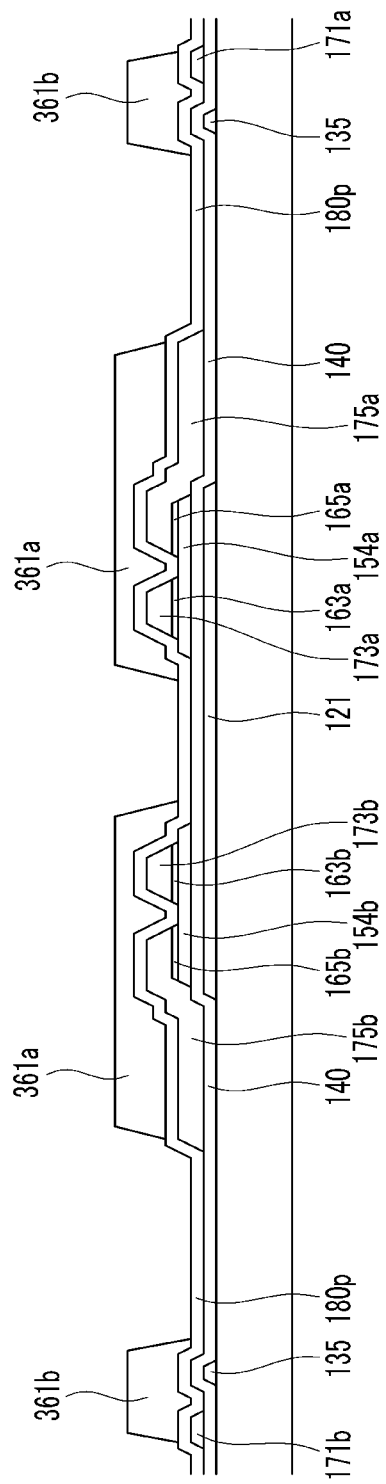
FIG. 15, FIG. 16, FIG. 17, and FIG. 18 are cross-sectional views sequentially showing a manufacturing method of a thin film transistor array panel for the liquid crystal display of FIG. 13 according to exemplary embodiments of the present invention.

Next, as shown in FIG. 15, a lower passivation layer 180p may be formed on the data lines 171a and 171b and the drain electrodes 175a and 175b. An organic insulator may be formed on the lower passivation layer 180p, and may be patterned to form lower partitions 361a and 361b.

Figure 16:
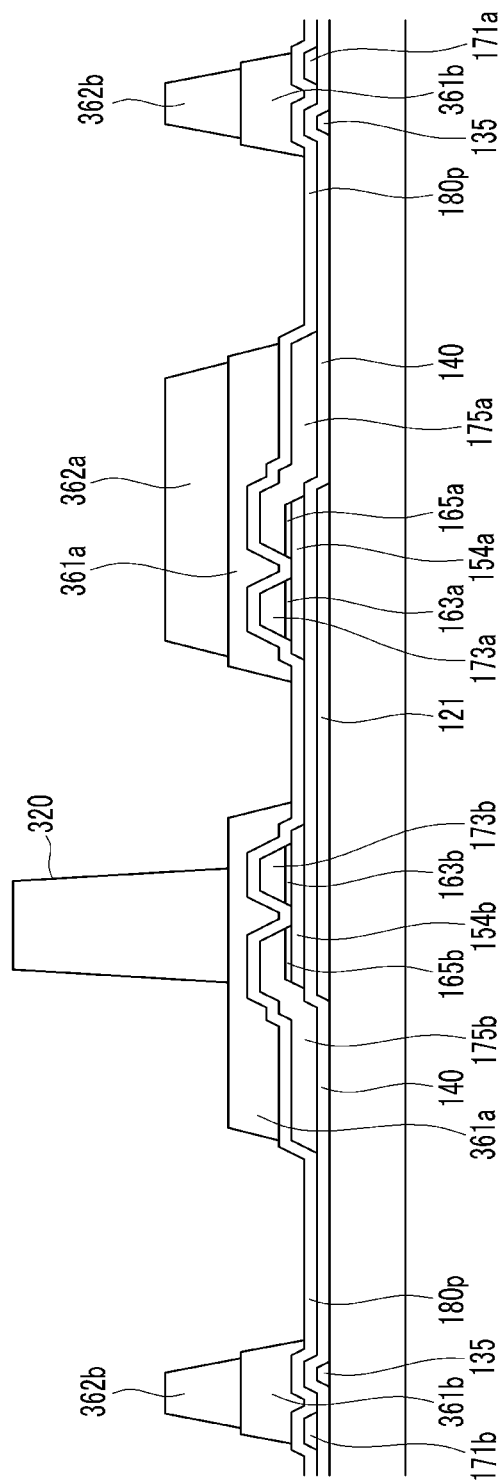

As shown in FIG. 16, upper partitions 362a and 362b and a spacer 320 having narrower widths than the lower partitions 361a and 361b may be formed on the lower partitions 361a and 361b.

The spacer 320 and organic insulator for the upper partitions 362a and 362b may be exposed by using a half-tone mask such as a slit mask, a lattice mask, or a semi-transparent mask to form the spacer 320 and the upper partitions 362a and 362b. The upper partitions 362a and 362b and the spacer 320 may have different dimensions (e.g., height, thickness).

If, during formation, lower partitions 361a and 361b are damaged by particles of the light exposer and due to contact deterioration along the substrate, the upper partitions 362a and 362b may be formed at the damaged portions such that ink from a neighboring pixel may still be prevented from being mixed.

The upper partitions 362a and 362b may be formed at damaged portions of the lower partitions 361a and 361b, and the upper partitions 362a and 362b may be more thickly formed than the lower partitions 361a and 361b.

Figure 17:
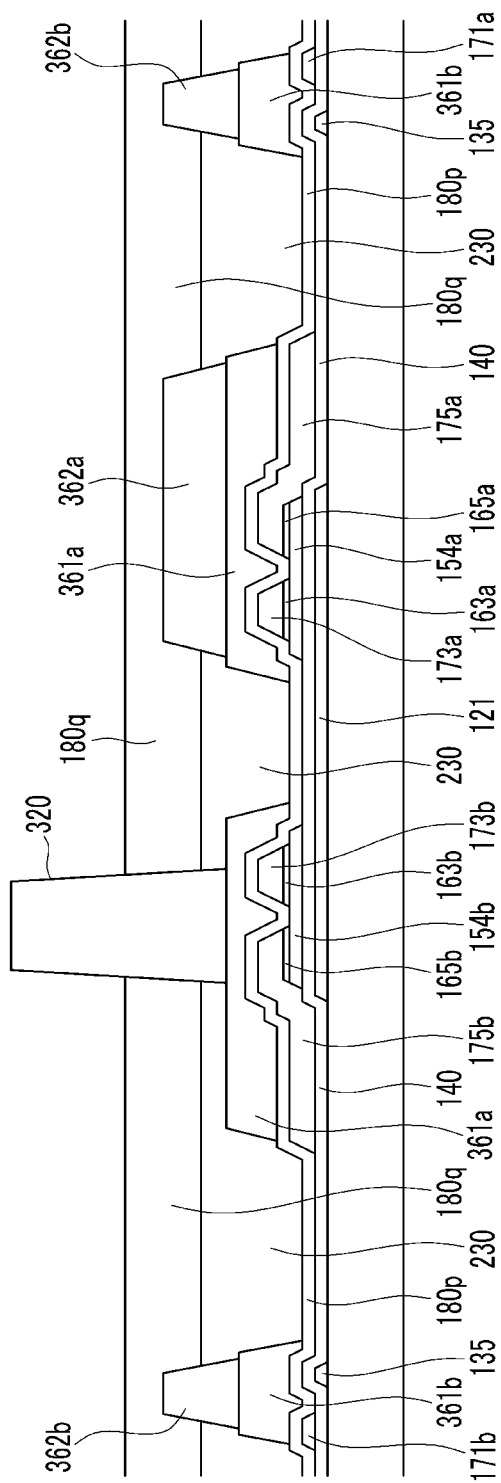

As shown in FIG. 17, a color filter 230 may be formed in an area defined by the partitions 361a, 361b, 362a, and 362b. The color filter 230 may be formed by Inkjet printing. An edge of the color filter 230 may be disposed on the lower partitions 361a and 361b.

An upper passivation layer 180q may be formed on the color filter 230. The upper passivation layer 180q may also be formed through inkjet printing. The upper passivation layer 180q may cover the upper partitions 362a and 362b, and the spacer 320 may remain uncovered.

Figure 18:
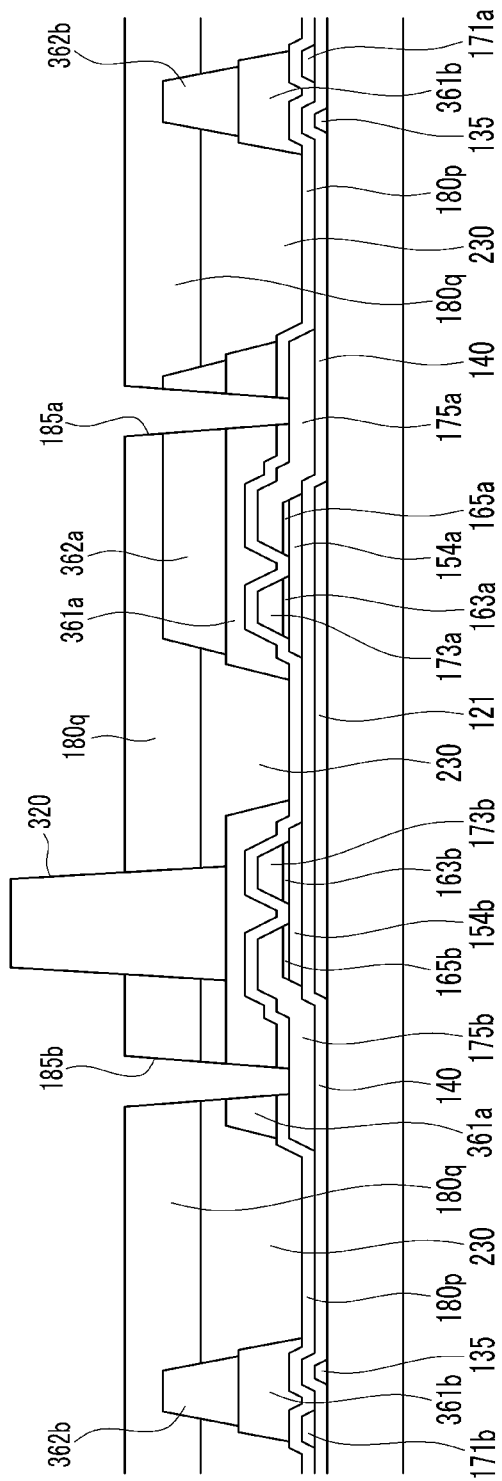

As shown in FIG. 18, the upper passivation layer 180q, the first portions 362a and 361a of the upper and lower partitions, and the lower passivation layer 180p may be patterned to form contact holes 185a and 185b. The lower passivation layer 180p may be dry-etched. The upper passivation layer 180q, the first portions 362a and 361a, and the lower passivation layer 180p may be etched together such that the inner boundary of the contact holes 185a and 185b may have substantially the same plane pattern and boundaries thereof.

Next, as shown in FIG. 13, a pixel electrode 191 may be formed on the upper passivation layer 180q.

Figure 19:
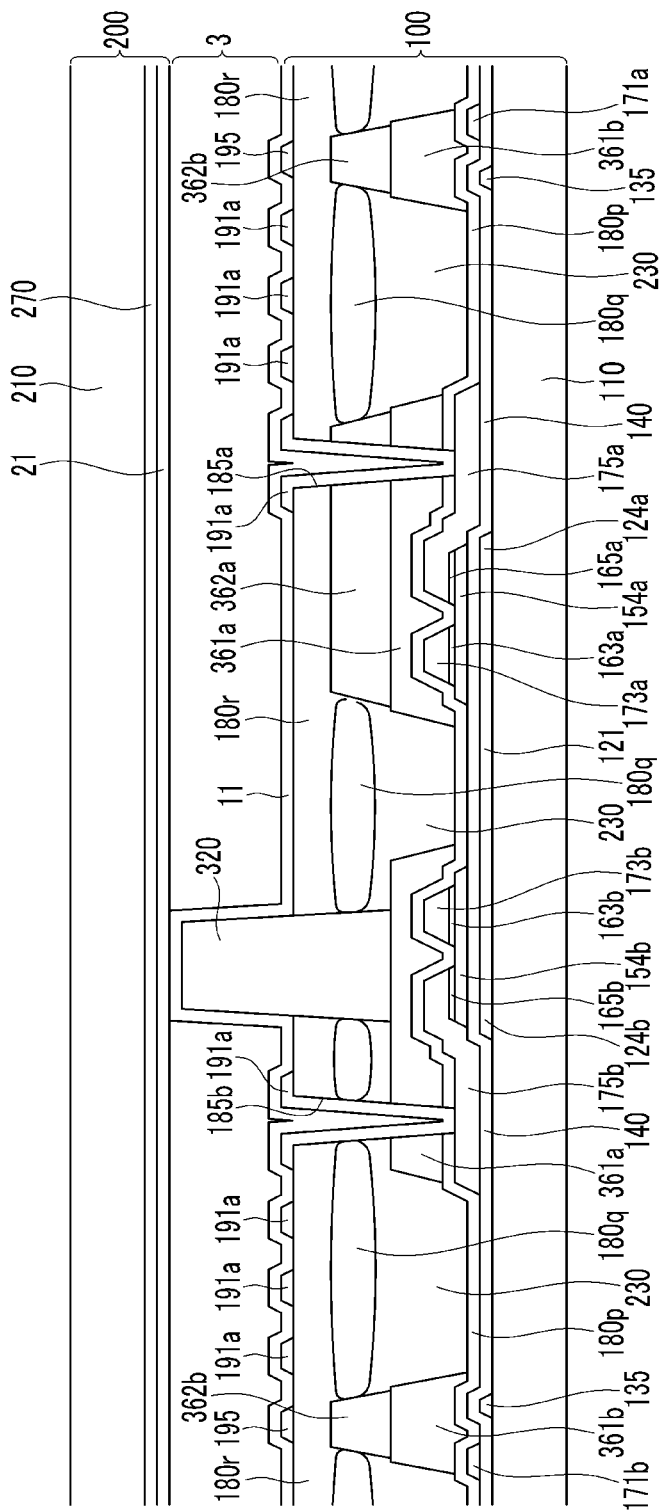
FIG. 19 is a cross-sectional view of a liquid crystal display according to exemplary embodiments of the present invention.

FIG. 19 is a cross-sectional view of a liquid crystal display according to exemplary embodiments of the present invention.

The LCD shown in FIG. 19 is similar to the illustrated exemplary embodiments of FIG. 3 and FIG. 13; however, the passivation layers 180p, 180q, and 180r may be formed as in FIG. 3, and the upper and lower partitions 361 and 362 and the spacer 320 may be formed as in FIG. 13.

In detail, a gate line 121 including gate electrodes 124a and 124b, and a storage electrode line 135 may be formed on a substrate 110. A gate insulating layer 140, semiconductors 154a and 154b, ohmic contacts 163a, 163b, 165a, and 165b, data lines 171a and 171b including source electrodes 173a and 173b, and drain electrodes 175a and 175b may be formed on the gate line 121 and the storage electrode line 135. A lower passivation layer 180p may be formed on the drain electrodes 175a and 175b and the data lines 171a and 171b.

Partitions including a lower partition 361 and an upper partition 362 may be formed on the lower passivation layer 180p. A filling region having an approximately quadrangular (e.g., rectangular) shape may be enclosed by the partitions. The color filter 230 and the first upper passivation layer 180q may fill the filling region.

The lower partition 361 and the upper partition 362 may have the same plane pattern, and the upper partition 362 may have a smaller width than the lower partition 361.

The lower and upper partitions 361 and 362 may include the first portions 361a and 362a situated relative to (e.g., above) the thin film transistor, and the second portions 361b and 362b may be formed on the gate lines 121 and the data lines 171. A spacer 320 having a greater height than the upper partition 362 may be formed in place of the first portion 362a of the upper partition 362.

The first upper passivation layer 180q may be formed on the color filter 230. The upper passivation layer 180q may be formed with the same height as the first and second portions 362a and 362b of the upper partition 362, or may cover the first and second portions 362a and 362b, and is not formed on the spacer 320.

The first upper passivation layer 180q may reduce the step size between the partition and the color filter 230.

The second upper passivation layer 180r may be formed across the entire surface of the substrate 110 such that the LCD structure may be planarized. The spacer 320 may have a height greater than a height of the second upper passivation layer 180r. The lower and upper partitions 361a, 361b, 362a, and 362b may be formed of black color organic material such that the lower and upper partitions 361a, 361b, 362a, and 362b may be used as light blocking members for preventing light leakage. The spacer 320 may also be formed of the black color organic material.

Exemplary embodiments of the present invention have been described above with relation to a LCD, however the present invention may be applied to an organic light emitting device by forming a partition, and filling a color filter or an emission material in the corresponding region.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a first substrate;
a gate line disposed on the first substrate;
a data line crossing the gate line;
a thin film transistor connected to the gate line and the data line;
at least one partition disposed on the gate line and the data line;
a color filter filling a region defined by the at least one partition;
a pixel electrode connected to the thin film transistor and disposed on the color filter;
a second substrate facing the first substrate; and
a spacer disposed on the at least one partition to maintain an interval between the first substrate and the second substrate, wherein the at least one partition comprises a lower partition and an upper partition having a smaller width than the lower partition, and
wherein an upper surface of the color filter is disposed at a height that is between a height of an upper surface of the lower partition and a height of an upper surface of the upper partition.

2. The display device of claim 1, further comprising:
a common electrode disposed on the second substrate; and
a liquid crystal layer disposed between the first substrate and the second substrate.

3. The display device of claim 2, further comprising:
an upper passivation layer disposed between the color filter and the pixel electrode,
wherein the upper passivation layer is disposed at a same height as the upper partition, or the upper passivation layer covers the upper partition.

4. The display device of claim 3, further comprising:
a lower passivation layer disposed on the thin film transistor, the gate line, and the data line.

* * * * *